US006418192B1

(12) United States Patent
Ratzmann

(10) Patent No.: US 6,418,192 B1
(45) Date of Patent: Jul. 9, 2002

(54) MULTIPLE ROW X-RAY TUBE BEARING ASSEMBLY

(75) Inventor: Paul Michael Ratzmann, Germantown, WI (US)

(73) Assignee: GE Medical Systems Global Technology Company, LLC, Waukesha, WI (US)

( * ) Notice: Subject to any disclaimer, the term of this patent is extended or adjusted under 35 U.S.C. 154(b) by 0 days.

(21) Appl. No.: 09/751,976

(22) Filed: Dec. 29, 2000

(51) Int. Cl.$^7$ ................................................ H01J 35/10
(52) U.S. Cl. ........................................ 378/132; 378/119
(58) Field of Search .................................. 378/132, 125, 378/127, 130, 131, 133, 143, 144, 119; 384/461

(56) References Cited

U.S. PATENT DOCUMENTS

| | | | | |
|---|---|---|---|---|
| 561,861 A | * | 6/1896 | Briscoe | 384/461 |
| 3,631,765 A | * | 1/1972 | Neumeister et al. | 92/52 |
| 5,978,448 A | * | 11/1999 | Bristol | 378/132 |

* cited by examiner

*Primary Examiner*—Robert H. Kim
*Assistant Examiner*—Hoon K. Song

(57) ABSTRACT

An x-ray tube assembly is provided, including a multiple row x-ray tube bearing assembly including an inner bearing member, an outer bearing member, and a free rotational intermediate race member positioned between the inner bearing member and the outer bearing member such that the inner bearing member and the outer bearing member may rotate independently of each other.

18 Claims, 1 Drawing Sheet

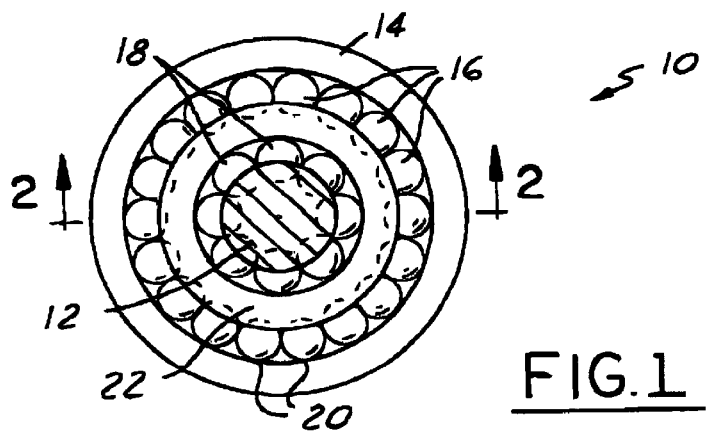
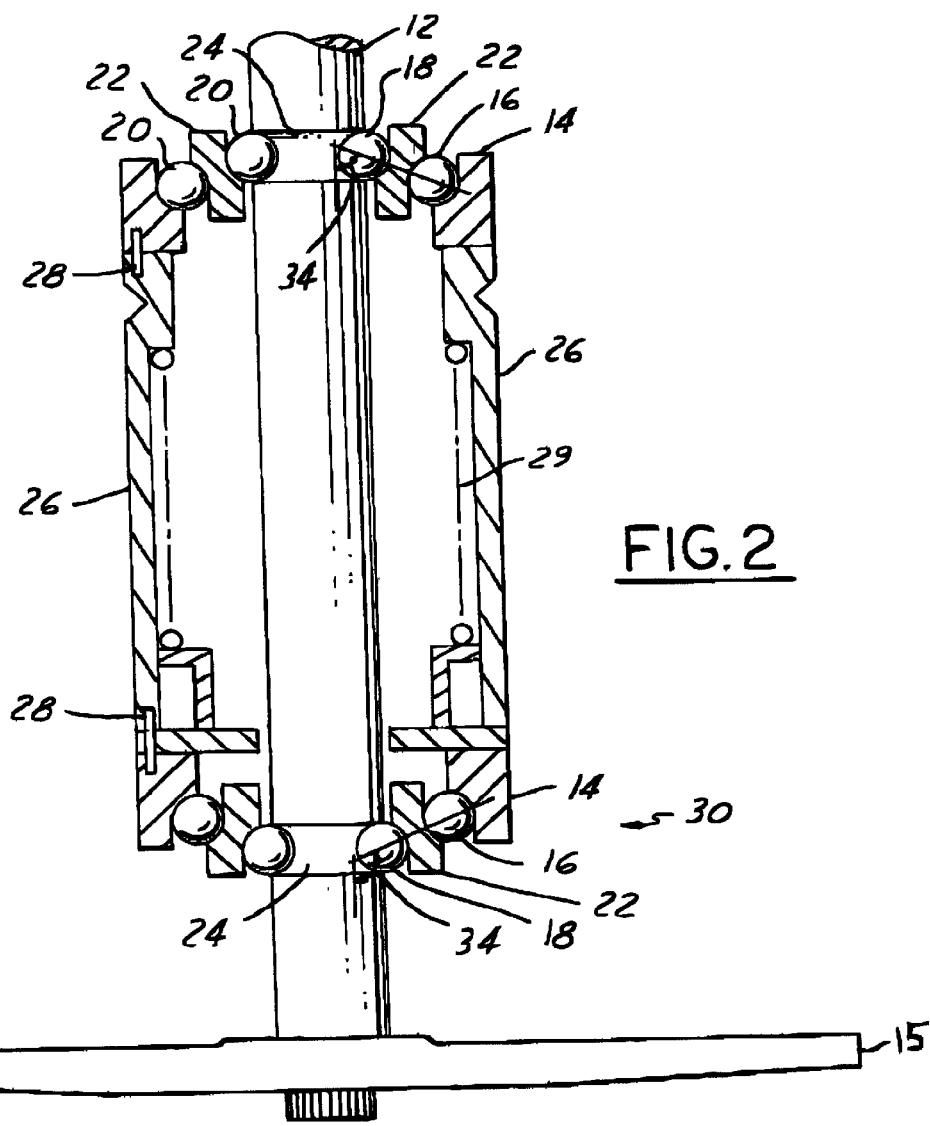

MULTIPLE ROW X-RAY TUBE BEARING ASSEMBLY

TECHNICAL FIELD

The present invention relates generally to a bearing assembly for use in an x-ray tube and more particularly to a multiple row bearing assembly for use in an x-ray tube.

BACKGROUND OF THE INVENTION

Inner rotation x-ray tube bearings for use in a rotating anode x-ray tube device are well known in the prior art. One typical type of x-ray tube support bearing includes ball bearing positioned between an inner and outer race to provide bearing support for the assembly. Although such bearing designs are common, they are not without disadvantages.

It is possible for present bearing designs to transfer torque through the ball bearings to the outer race. This transfer of torque can result in the rotation of the outer race which may in turn contribute to chatter of the bearing assembly. This is highly undesirable. In addition, present designs with a stationary, or nearly stationary, outer race may result in high velocities of the ball bearings during operation. The combination of rubbing due to race rotation, chatter, and high ball velocities can result in high acoustic noise generation during operation. This is, of course, highly undesirable.

Considerable effort and time has gone into the advancement of systems to lubricate the ball bearings in such designs in an effort to reduce these negative characteristics. These advancements in lubrication, however, can come at the expense of an increase in cost of the bearing assembly. In addition, such lubrication systems often leave room for improvement in the reduction of ball speed, torque transfer, and chatter. Reductions in such characteristics are highly desirable as they may lead to reduced wear on the ball bearings, an increase in the life cycle of the bearings, a reduction in acoustic noise generation, and possibly an increased anode run speed of the tube.

Therefore, there is a need for an x-ray tube bearing assembly that reduces ball speed, reduces transfer torque, reduces chatter, reduces acoustic noise generation, and may allow for an increase in the anode run speed of the tube.

SUMMARY OF THE INVENTION

It is, therefore, an object of the present invention to provide a bearing assembly for use in an x-ray tube with reduced ball speed, transfer torque, chatter, and acoustic noise generation. It is a further object of the present invention to provide a bearing assembly for an x-ray tube that may allow for increased anode run speeds.

In accordance with the objects of this invention, a multiple row x-ray tube bearing assembly is provided. The multiple row x-ray tube bearing assembly includes an inner bearing member and an outer bearing member. The outer bearing member surrounds the inner bearing member and both bearing members rotate about the same primary axis. A free rotational intermediate race element positioned between the inner bearing member and the outer bearing member allows both the inner bearing member and the outer bearing member to rotate independently of each other. The ability of each bearing member to rotate independently can reduce ball velocity, outer race rotation, rubbing, and chatter, among other benefits.

Other objects and features of the present invention will become apparent when viewed in light of the detailed description of the preferred embodiment when taken in conjunction with the attached drawings and the appended claims.

BRIEF DESCRIPTION OF THE DRAWINGS

FIG. 1 is a top view of an embodiment of a multiple row x-ray tube bearing assembly in accordance with the present invention; and FIG. 2 is a cross-sectional view of an embodiment of a multiple row x-ray tube bearing assembly as shown in FIG. 1, the cross-section being taken along the lines 2—2 in the direction of the arrows.

DESCRIPTION OF THE PREFERRED EMBODIMENT(S)

Referring now to FIG. 1, which is a top view of a multiple row x-ray tube bearing assembly 10 in accordance with the present invention. The multiple row x-ray tube bearing assembly 10 includes a rotating element 12 and an outer race 14. The rotating element 12 is commonly in communication with an anode 15, allowing the anode 15 to rotate. In known designs (not shown), it is common for a single bearing member to be placed between the rotating element 12 and outer race 14. When such a single bearing member (not shown) is used, it is possible for undesirable torque to be passed to the outer race 14, for undesirable ball velocity to develop, for chatter to develop, and for high acoustic noise generation to develop when the rotating member 12 begins to rotate. This can be especially true when the outer race 14 is stationary or nearly stationary. The present invention reduces these characteristics by including an outer bearing member 16 and an inner bearing member 18. In one embodiment, both the outer bearing member 16 and the inner bearing member 18 consist of a plurality of ball bearings 20. In other embodiments, however, a variety of types of bearing members are contemplated. A free rotational intermediate race member 22, positioned between the outer bearing member 14 and the inner bearing member 18, allows the outer bearing member 16 and the inner bearing member 18 to move independently of each other.

Referring now to FIG. 2, which is a cross-sectional illustration of an embodiment of a multiple row x-ray tube bearing assembly in accordance with the present invention. An inner race 24 is formed into the rotating member 12 to provide a track for the inner bearing member 18. It should be understood, however, that the inner race 24 may be formed as an independent member (not shown) and its configuration may be adjusted to account for differing bearing members. Where its use is appropriate, a wide variety of configurations for the inner race 24 are contemplated.

A spacer element 26 and pin elements 28 connecting the spacer element 26 to the outer race 14 are also disclosed. A pre-load spring 29 may also be included. These elements are useful in holding groups of multiple row x-ray tube bearing assemblies 10 together as a unit. Although the spacer element 26, the pin elements 28, and the pre-load spring 29 are shown, it should be understood that they are for illustrative purposes only and that a wide variety of configurations using multiple row bearings are contemplated including configurations that do not require use of a spacer element 26, a pin element 28 or a pre-load spring 29. As was previously discussed, when the inner rotational member 12 rotates, the present invention, using free rotational intermediate race 24, allows the outer bearing member 16 and the inner bearing member 18 to rotate independently of each other. This reduces the velocity of the ball bearings 20 as they rotate in their given bearing members. In addition, the torque transmitted to the outer race 14 is reduced. This allows a reduction in outer race 14 rotation, chatter, and high acoustic noise generation. In one embodiment, the multiple row x-ray tube bearing assembly includes a front bearing group 30 and a rear bearing group 32 using separate groups of bearings. In other embodiments, however, numerous groups of bearing assemblies and alternate configurations may be utilized.

In one embodiment the contact angles 34, created where the bearing members 16, 18 contact the races 14,22,24, are collinear for both the inner bearing member 18 and the outer bearing member 18. Although an angle is shown for illustrative purposes, a variety of varying contact angles 34 are contemplated. In an alternate embodiment (not shown) the outer bearing member 16 and the inner bearing member 18 are aligned perpendicular to both each other as well as the axis of the rotating member 12.

Although the present invention has been described as having an outer bearing member 16 and an inner bearing member 18 separated by free rotational intermediary race 24, it should be understood that additional rows of bearing members (not shown) separated by additional free rotational intermediate races (not shown) may be added to the present invention to further reduce ball velocity, transfer torque, chatter, and high acoustic noise generation during operation. In addition, although the present invention has been described as having an inner rotational member 12, it should be understood that in alternate embodiments (not shown) the inner rotational member 12 may be stationary and the outer assembly (the outer race 14 and spacer element 26 for example) may be the active rotational member. In other words, the present invention is capable of being used as an inner or an outer rotational bearing.

While particular embodiments of the invention have been shown and described, numerous variations and alternative embodiments will occur to those skilled in the art. Accordingly, it is intended that the invention be limited only in terms of the appended claims.

What is claimed is:

1. An x-ray tube assembly comprising:
   a multiple row x-ray tube bearing in communication with an anode, said multiple row x-ray tube bearing allowing rotation of said anode, said multiple row x-ray tube comprising:
      an inner bearing member;
      an outer bearing member surrounding said inner bearing member and rotating about the same primary axis as said inner bearing member; and
      a free rotational intermediate race member, positioned between said inner bearing member and said outer bearing member such that said inner bearing member and said outer bearing member may rotate independently of each other.

2. An x-ray tube assembly as described in claim 1 wherein said inner bearing member includes a plurality of ball bearings.

3. An x-ray tube assembly as described in claim 1 wherein said outer bearing member is comprised of a plurality of ball bearings.

4. An x-ray tube assembly as described in claim 1 for use with a stationary outer race.

5. An x-ray tube assembly as described in claim 1 further comprising:
   at least one additional bearing member positioned between said inner bearing member and said outer bearing member; and
   at least one additional free rotational intermediate race member positioned between said at least one additional bearing member and said outer bearing member.

6. An x-ray tube assembly as described in claim 1 further comprising:
   at least one additional bearing member positioned between said inner bearing member and said outer bearing member; and
   at least one additional free rotational intermediate race member positioned between said at least one additional bearing member and said inner bearing member.

7. An x-ray tube assembly as described in claim 1 further comprising:
   an inner race in communication with said inner bearing; and
   an outer race in communication with said outer bearing.

8. An x-ray tube assembly as described in claim 1 wherein the contact angles of said inner bearing member and said outer bearing member are collinear.

9. An x-ray tube assembly as described in claim 1 for use with for use with a plurality of bearing groups.

10. An x-ray tube assembly comprising:
    a multiple row x-ray tube bearing in communication with an anode, said multiple row x-ray tube bearing allowing rotation of said anode, said multiple row x-ray tube comprising:
       a front bearing group comprising:
          a front inner bearing member;
          a front outer bearing member surrounding said inner bearing member and rotating about the same primary axis as said inner bearing member; and
          a front free rotational intermediate race member, positioned between said inner bearing member and said outer bearing member such that said inner bearing member and said outer bearing member may rotate independently of each other; and
       a rear bearing group comprising:
          a rear inner bearing member;
          a rear outer bearing member surrounding said inner bearing member and rotating about the same primary axis as said inner bearing member; and
          a rear free rotational intermediate race member, positioned between said inner bearing member and said outer bearing member such that said inner bearing member and said outer bearing member may rotate independently of each other.

11. An x-ray tube assembly as described in claim 10 wherein said front inner bearing member includes a plurality of ball bearings.

12. An x-ray tube assembly as described in claim 10 wherein said front outer bearing member is comprised of a plurality of ball bearings.

13. An x-ray tube assembly as described in claim 10 for use with a stationary outer race.

14. An x-ray tube assembly as described in claim 10 further comprising:
    at least one additional bearing member positioned between said front inner bearing member and said front outer bearing member; and
    at least one additional free rotational intermediate race member positioned between said at least one additional front bearing member and said front outer bearing member.

15. An x-ray tube assembly as described in claim 10 further comprising:

at least one additional bearing member positioned between said front inner bearing member and said front outer bearing member; and at least one additional free rotational intermediate race member positioned between said at least one additional bearing member and said front inner bearing member.

16. An x-ray tube assembly as described in claim 10 further comprising:

a inner race in communication with said front inner bearing; and a outer race in communication with said front outer bearing.

17. An x-ray tube assembly as described in claim 10 wherein the contact angles of said front inner bearing member and said front outer bearing member are collinear.

18. An x-ray tube assembly as described in claim 10 comprising at least one additional bearing group.

* * * * *